Dec. 1, 1925.

J. B. DRENNAN

AUTOMOBILE BUMPER

Filed Feb. 4, 1925

1,563,475

Inventor:
James B. Drennan,
By his
Attorney,
Horace Barnes

Patented Dec. 1, 1925.

1,563,475

UNITED STATES PATENT OFFICE.

JAMES B. DRENNAN, OF PORTLAND, OREGON.

AUTOMOBILE BUMPER.

Application filed February 4, 1925. Serial No. 6,726.

*To all whom it may concern:*

Be it known that I, JAMES B. DRENNAN, a citizen of the United States, residing at Portland, in the county of Multnomah and State of Oregon, have invented certain new and useful Improvements in Automobile Bumpers, of which the following is a specification.

This invention relates to improvements in automobile bumpers; and has for its primary object the provision of a device, of said class of simple and economical construction that will efficiently safeguard the vehicle from injury due to collision and which will combine the maximum of resilient resistance and power to absorb harmlessly the shocks encountered with lightness of weight and stability.

It is the further object of my invention to provide a bumper of the class described that comprises a plurality of structural units which may be combined with connecting bars to form a complete protection for the entire width of a standard automobile or which may be advantageously utilized as separate bumper elements for the protection of certain portions of the car.

It is the province of the present invention to improve generally the present construction and design of automobile bumpers, and other objects and advantages and objects relating to details of construction will be readily apparent in the course of the detailed description to follow.

The accompanying drawings illustrate by way of example forms in which my invention may be embodied, in which.

Figure 1:
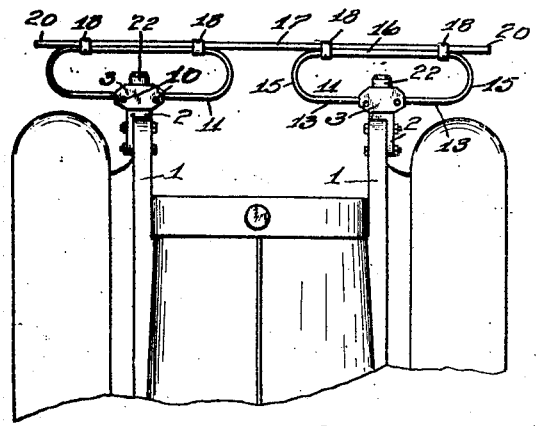
Figure 1 is a plan view of an automobile showing embodiments of my invention attached thereto at front and rear.
Figure 3:
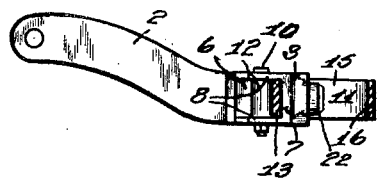
Fig. 3 is a view in cross section on line 3—3 of Fig. 2.
Figure 2:
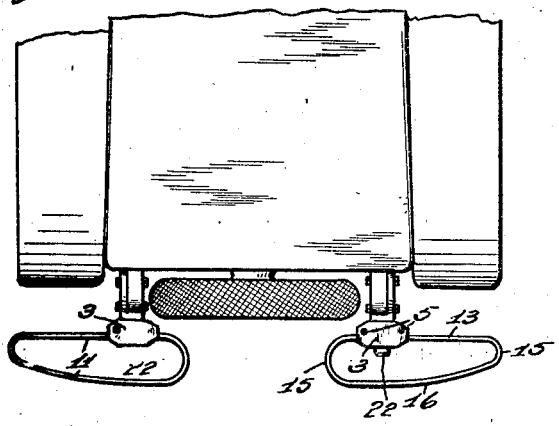
Fig. 2 is a detached plan view of one of the elements of my invention, shown partly in horizontal section.
Figure 2:
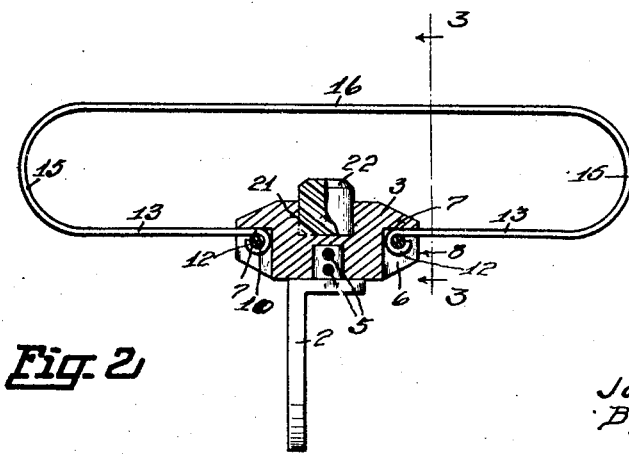

Referring to said drawings, in which similar reference numbers indicate like parts in the several views, the reference numerals 1 designate the parallel, longitudinal frame-members of an antomobile to which my improved bumper is shown rigidly attached by brackets 2, although it may obviously be mounted upon any suitable portion of the car.

A header-block 3 is rigidly mounted at its inner side upon the outer end of each bracket 2, as by bolts 5. Said blocks may desirably be formed of relatively light steel forgings and having their longer dimensions extending transversely of the car. They are each formed upon each of its lateral ends with a reentrant rectangular notch 6 extending horizontally thereinto from the rear and the respective end. Each said notch includes a wall 7 both of said walls being directed outwardly in the same line transversely of the car. Webs 8 integral with the block extend horizontally over said notches and are each apertured to receive vertically disposed bolts 10.

Bow-spring elements 11 are mounted on each said block and are formed at each end with an eye 12 through which the respective bolts 10 extend. Said bows extend from the eyes 12 in opposite transverse directions and in substantially straight lateral alignment, as at 13, and adjacent the eyes 12 are disposed to bear upon the respective walls 7. Said bows are formed with relatively open curved ends 15 and a front, intermediate portion 16 more or less parallel with the rear straight portions 13. The front portion 16 is spaced forwardly of the block to afford sufficient distance for considerable inflection of the bow before the portion 16 can strike the block.

The bows 11 are formed of flat spring material with their edges disposed vertically and are supported by the bolts 10 and between the webs 8 in a horizontal plane and in the bowed form substantially as shown and described without tension therein.

A bar 17 of spring material is secured to the outer portions 16 of the spring-elements 11 and parallel therewith by suitable clips 18. Said bar connects the two bow-springs together that ordinarily form the bumper and bridge the gap therebetween and thereby afford a homogeneous construction. The ends 20 of the bar may extend beyond the respective bow-springs, as shown plainly in the upper portion of Fig. 1, or the bow-springs may be extended outwardly to protect the fenders more thoroughly in themselves, somewhat as shown in the view of the rear bow-springs in Fig. 1.

In each said block I form a recess 21 extending into the block from the front face thereof and between the notches 6 into which a cushion 22 of rubber material is seated and secured as by cementing. Said cushion extends outwardly of the recess for a relatively considerable distance and is in line to receive the impact of the portion 16 of the bow-spring if the same is pressed inwardly by sufficient force.

The slightly modified form of the invention shown mounted on the rear of the car illustrated in Fig. 1 differs from that heretofore described merely in the contour of the bow-springs and is a form that may be used to advantage when it is to be used in mutually detached condition, as shown.

With the bumper assembled as described it affords an extremely effective protection for the car against the effects of collision. Shocks encountered adjacent either of the bow-springs will be absorbed directly by such element without communication to the car while shocks received by the bar 17 will be distributed throughout the spring elements 11. The bows 11 are free to yield under shock or tension at their extremities 15 due to their pivotal connections at 6 with the bolts 10, while the walls 7 against which they bear ensure that they will be maintained in operative position transversely of the car and at the same time free to yield rearwardly under shock or pressure.

A severe shock will cause the bow-spring to resiliently collapse and bringing the front portion 16 against the cushion 22 and deadening the shock to the car as well as protecting the bumper itself against injury. This cushion is of considerable depth so that it adds real immunity to the device against shocks that ordinarily will destroy the usefulness of the bumper.

While I have described my invention with considerable detail I do not wish to be understood as confining myself to the precise constructions shown and described, as, obviously, changes in form and minor constructional details may be resorted to so long as they do not depart from the spirit of the invention as defined in the appended claims.

Having described my invention, what I claim, is,—

1. In an automobile bumper, a supporting block rigidly connected to the frame of a car having a notch at each of its lateral ends and a vertically disposed bolt, and a bow-spring having an eye at each end pivotally secured to said bolts, respectively, and extending at its middle portion across and in front of said block.

2. In an automobile bumper, a block rigidly connected to the frame of a car formed with a reentrant angular notch at each of its lateral ends, one wall of each said notch extending in direction transversely of the car, and a bow-spring pivotally secured at each of its extremities in the respective notch and arranged to bear upon said wall.

3. In an automobile bumper, a block rigidly connected to the frame of a car formed with a reentrant angular notch at each of its lateral ends, a vertical wall of each said notch extending in direction transversely of the car, a bow-spring pivotally secured at each of its extremities in the respective notch and arranged to bear upon said wall, and a cushion secured in the front face of said block in horizontal line with said notches.

4. In an automobile bumper, the combination with a block rigidly connected to the frame of a car formed with a notch upon each of its lateral ends, said notch having integral webs upon the upper and lower sides thereof, and a vertically arranged bolt extending through said webs of each notch, of a bow-spring receivable edgewise between said webs and operatively connected with said bolts.

5. In an automobile bumper, a support rigidly connected to the frame of a car, and a bow-spring pivotally connected at each of its ends to the lateral sides of said support, said support admitting of rearward movement of the bow-spring about its pivots and limiting the forward movements thereof.

6. An automobile bumper, consisting in a pair of supports rigidly connected to the frame of a car, a pair of bow-springs pivotally connected to said supports to yield rearwardly about its pivots, and a metal bar secured to the forward portions of said springs.

JAMES B. DRENNAN